United States Patent
Kaminsky

[11] Patent Number: 6,029,390
[45] Date of Patent: *Feb. 29, 2000

[54] METAL FISHING LURE

[76] Inventor: Mark Kaminsky, 7100 Holiday, Bloomfield Hills, Mich. 48301

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,511

[22] Filed: Sep. 13, 1996

Related U.S. Application Data

[60] Provisional application No. 60/003,693, Sep. 13, 1995.

[51] Int. Cl.$^7$ .................................................. A01K 85/00
[52] U.S. Cl. .......................... 43/42.53; 43/42.5; 43/42.32
[58] Field of Search ................................ 43/42.53, 43.16, 43/42.5, 42.32

[56] References Cited

U.S. PATENT DOCUMENTS

| | | | |
|---|---|---|---|
| 103,645 | 5/1870 | Muscroft | 43/43.16 |
| 2,188,753 | 1/1940 | Jennings | 43/42.32 |
| 2,796,693 | 6/1957 | Gunterman | 43/42.32 |
| 2,799,963 | 7/1957 | Noer | 43/42.32 |
| 2,938,296 | 5/1960 | Kracht | 43/43.16 |
| 4,471,557 | 9/1984 | Gage | 43/42.53 |
| 4,479,323 | 10/1984 | Burr | 43/42.5 |
| 4,570,373 | 2/1986 | Brief | 43/43.16 |
| 4,862,631 | 9/1989 | Wilson et al. | 43/42.33 |
| 4,928,423 | 5/1990 | Furuta . | |
| 4,953,321 | 9/1990 | Furuta . | |
| 5,113,616 | 5/1992 | McManus | 43/43.16 |
| 5,241,775 | 9/1993 | Matsumura | 43/43.16 |
| 5,605,004 | 2/1997 | Boullt | 43/44.83 |

FOREIGN PATENT DOCUMENTS 11061366  3/1999  Japan .

OTHER PUBLICATIONS

Studio Preparation and Coloring of Titanium, William A. Seeley, Submitted to the Department of Fine Arts an the Faculty of the Graduate School of the University of Kansas, 1982.

Primary Examiner—Kurt Rowan
Attorney, Agent, or Firm—Gifford, Krass, Groh, Sprinkle, Anderson & Citkowski, P.C.

[57] ABSTRACT

A fishing lure and method for producing the lure having a body formed from a metal from the group of titanium, niobium, tantalum, vanadium, zirconium and hafnium. The metal is colored by thermal oxidation or anodizing and formed into a desired body shape, such as a blade, spoon, or spinner. The hook and filament for attaching the hook to the lure body are formed of the same metal which the body is formed from.

3 Claims, 1 Drawing Sheet

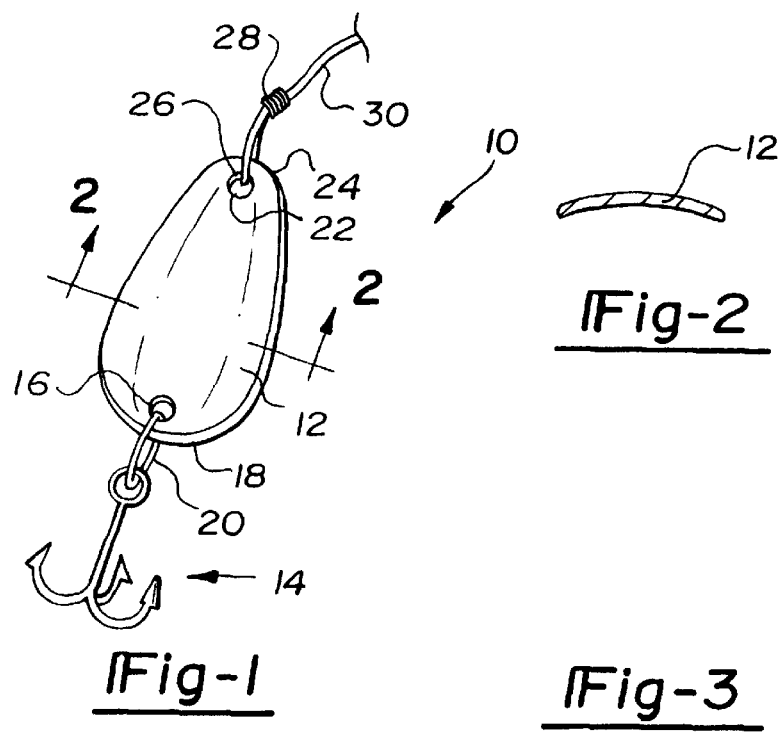
Fig-1
Fig-2
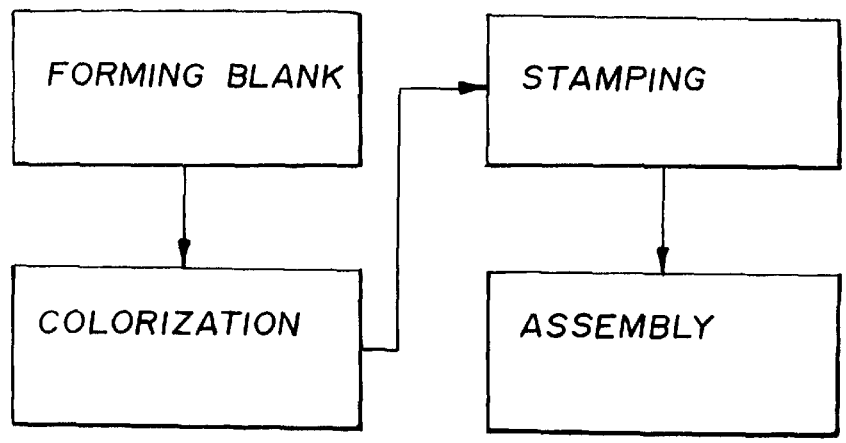
Fig-3
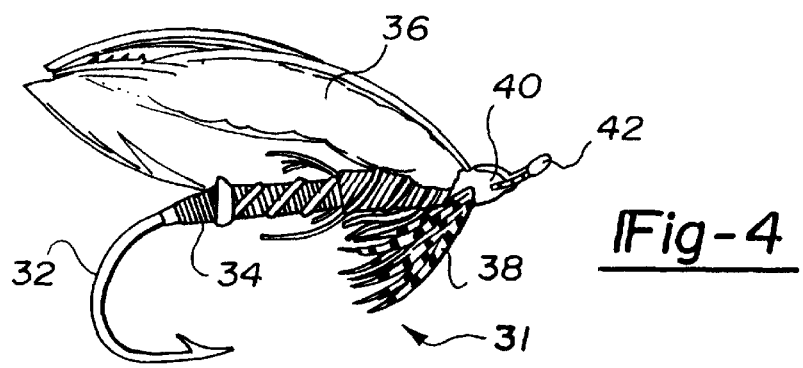
Fig-4

METAL FISHING LURE

This application claims the benefit of U.S. Provisional Application No. 60/003,693 Filed Sep. 13, 1995.

FIELD OF THE INVENTION

This invention relates to fishing lures, and more particularly, to artificial fish bait formed of transition metals which reflect and refract light.

BACKGROUND OF THE INVENTION

Fishing lures attached to a fishhook are used to attract fish. Attracted by the lure, the fish then come into contact with the fishhook and then are easily pulled in by the fisherman.

Fishing lures come in many shapes and configurations, ranging from colorful fish-like plastic lures to bug-shaped dark lures. Attracting fish is not an exact science, and over the years a multitude of fish lure designs have been used.

U.S. Pat. No. 4,862,631 discloses a fishing lure having a hard body with a light-refractive metallic coating. The coating is formed of glass spheres overlaying the metallic coating. The glass spheres are imbedded in a coating of clear lacquer or polyurethane. The substrate is aluminum and the glass spheres contain 70–80% by weight titanium dioxide. However, such lures are expensive to make. Accordingly, it is an object of this invention to provide a fishing lure which is natural in its appearance which produces a unique color change which attracts fish.

It is also an object of this invention to produce a fishing lure which is durable and inexpensive to produce.

SUMMARY OF THE INVENTION

The present invention relates to a fishing lure and method of producing the same. The fishing lure includes a body formed from a metal from the group of titanium, niobium, tantalum, vanadium, zirconium, and hafnium. These metals are VA transition metals (with the exception of titanium) and have excess electrons. The metal is colored by thermal oxidation or anodizing. After colorization, the metal produces multiple light frequencies after light stimulus. The blank is formed into a desired shape, such as a blade, spinner or a spoon, by a suitable means such as stamping. Holes are then formed in either end for connection of a fish hook at one end and a swivel for attachment to the fishing line at the other end.

In the preferred embodiment, the fish hook and filament connecting the hook to the body are formed of the same material that the lure is formed of. Also disclosed is an artificial fly formed using a filament of transition metal.

Additional objects and advantages of the invention will become apparent as the following detailed description of the invention is read and considered in conjunction with the accompanying drawings which illustrate a preferred embodiment of the invention, and which serve to demonstrate the basic principals entailed in such a preferred embodiment, as well as any other alternative embodiments not specifically illustrated.

DESCRIPTION OF THE DRAWINGS

FIG. 1 is a perspective view of a lure constructed in accordance with the present invention;

FIG. 2 is a sectional view taken along line 2—2 of FIG. 1;

FIG. 3 is a flow chart illustrating the method of producing a lure; and

FIG. 4. is a perspective view of an alternative embodiment of the invention.

DETAILED DESCRIPTION OF A PREFERRED EMBODIMENT OF THE INVENTION

A fishing lure 10 in accordance with the invention is shown in FIG. 1. The fishing lure includes an elongated body 12 and a hook 14. Although the body 12 is shown in FIG. 1 as a spinner, the body 12 may be formed as a spinner blade or spoon. As discussed, the body 14 is formed from ne metal from a group consisting of niobium, tantalum, vanadium, zirconium, hafnium and titanium. the metals are colorized to provide a unique characteristic color. The elongated boy 12 has a curved cross-section as shown in FIG. 2. An eyelet 16 is positioned in a lower end 18 for receiving a wire or filament 20 for attaching the body 12 to the hook 14. The hook may be of any conventional type, but in the preferred embodiment, the hook 14 and filament 20 are formed of the same metal as the body 12. An eyelet 22 is formed in an upper end 24 of the body 12 for receiving a wire or filament 26 for attaching the body to a swivel 28 and further attachment to a fishing line 30.

As shown in FIG. 3, the method of forming the lure includes forming a blank of metal from the group of titanium, niobium, tantalum, vanadium, zirconium and hafnium. These metals are all VA transition metals (with the exception of titanium). These metals have excess electrons.

The next step is to colorize the metal blank either by anodization or thermal oxidation as discussed in the article entitled *Studio Preparation and Coloring of Titanium* by William A. Seeley submitted to the Department of Fine Arts and the Faculty of the Graduate School of the University of Kansas, 1982. This article is incorporated by reference and presents procedures for coloring these metals by thermal oxidation or anodization to produce a unique characteristic color which is particular to the metal and process. After colorization, these metals will produce a variety of colors depending upon the angle from which they are viewed. It is desirable to form the metal into a curved shape to more readily produce a variety of colors to an observing fish as the fish moves with respect to the lure. The metal produces a multi-colored bright reflection and refraction which is believed to have a superior ability to attract fish.

After colorization, the metal blank is formed into the desired body 12 by a suitable manner, such as stamping. The surface texture of the body can be cut by machine, sand blasting, or engraving. After stamping, the metal may be finished by grinding or filing to produce a desired finish.

After stamping the eyelets 16 and 22 are formed in the blank. The hook 14 may then be assembled by way of the wire or filament 20 into the eyelet 16 and the swivel 28 is attached to the eyelet 22. The hook 14 and filaments 20 and 26 are advantageously produced form the same method which is used for the body.

Shown in FIG. 4 is an artificial fly 30. The fly includes a fishhook 32 and filament ribbing 34 formed of one of the transition metals described above. The fly 30 also includes wing 36 and hackle 38 formed as is known in the art from feathers and the like. The fly 30 also includes a head 40. An eyelet 42 is formed on the end of the hook 32. The hook, filament, and eyelet are all formed of a transition metal from the group set forth above. The hackle may also be formed by using fine filament or wire of the transition metals. The metal is colorized to provide a fly with improved light reflection.

Accordingly, a novel fishing lure and method of making is disclosed. The fishing lure is readily formed and will produce a variety of colors, depending upon which metal is chosen and the colorization process. The metal lures, according to the invention, are non-corrosive and durable.

Although the preferred embodiment of the present invention has been herein described in order to describe the basic principles utilized in the invention, changes and innovations in the precise structural characteristics can be effected without departure from the basic principles. Changes and innovations of this type are therefore deemed to be circumscribed by the spirit and scope of the present invention as set forth in the appended claims.

I claim:

1. A method of forming a fishing lure comprising:
   (1) forming an elongated blank of one metal from a group of metals consisting essentially of titanium, niobium, tantalum, vanadium, zirconium, and hafnium, said blank having a pair of spaced apart continuous curved surfaces extending between a pair of ends;
   (2) treating at least one of said pair of curved surfaces of said blank to a colorization treatment of one of the steps of anodization and thermal oxidation whereby said at least one surface is oxidized to produce multiple light frequencies after light stimulus; and
   (3) forming a throughbore through said pair of surfaces adjacent one of said pair of ends.

2. A fishing lure for use with a fishing line and a hook comprising:

an elongated body having a pair of ends formed of a metal from a group of metals consisting essentially of titanium, niobium, tantalum, vanadium, zirconium, and hafnium, said body having a pair of spaced apart continuous surfaces and a throughbore adjacent one end of said pair of ends;

said surfaces having been colorized by one of anodization or thermal oxidation to form metal oxides thereon whereby said metal oxides disposed on said surfaces produce multiple light frequencies after light stimulus; and said throughbore adapted for attachment to said fishing line.

3. The fishing lure of claim 2, wherein said hook is attached to said body by a filament formed of the same metal as said body.

* * * * *